United States Patent
Chen

(10) Patent No.: US 7,993,004 B2
(45) Date of Patent: Aug. 9, 2011

(54) PROJECTING DEVICE

(75) Inventor: Ga-Lane Chen, Santa Clara, CA (US)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 305 days.

(21) Appl. No.: 12/347,265

(22) Filed: Dec. 31, 2008

(65) Prior Publication Data
US 2010/0002194 A1    Jan. 7, 2010

(30) Foreign Application Priority Data
Jul. 3, 2008 (CN) .......................... 2008 1 0302514

(51) Int. Cl.
G03B 21/14 (2006.01)
G03B 21/00 (2006.01)
(52) U.S. Cl. ............................... 353/20; 353/84; 353/31
(58) Field of Classification Search .................. 353/101, 353/122, 31, 142, 20, 84, 98, 99; 359/142, 359/146, 148; 348/771
See application file for complete search history.

(56) References Cited

U.S. PATENT DOCUMENTS
6,457,830 B1 * 10/2002 Choi ............................... 353/33
6,798,469 B2 * 9/2004 Kimura ........................... 349/61
2008/0198453 A1 * 8/2008 LaFontaine et al. .......... 359/485

FOREIGN PATENT DOCUMENTS
CN 1482472 A 3/2004
CN 1704798 A 12/2005
* cited by examiner Primary Examiner — Georgia Epps
Assistant Examiner — Don Williams
(74) Attorney, Agent, or Firm — Clifford O. Chi

(57) ABSTRACT

A projecting device includes a light source, a filtering component, a reflecting mirror, a digital micro-mirror device, a projecting lens, and a panel. The filtering component changes lights emitted from the light source into substantially parallel polarized ultraviolet lights. The reflecting mirror reflects the substantially parallel polarized ultraviolet lights to the digital micro-mirror device. The digital micro-mirror device includes microscopic mirrors arranged in a rectangular array configured to be adjustable to reflect the substantially parallel polarized ultraviolet lights reflected by the reflecting mirror to the projecting lens. The projecting lens diverges the substantially parallel polarized ultraviolet lights. The panel includes a transparent substrate, a first fluorescence material layer, a second fluorescence material layer, and a third fluorescence material layer. The first, second, and third fluorescence material layers are positioned on the transparent substrate and emit red, blue and green lights when excited.

15 Claims, 1 Drawing Sheet

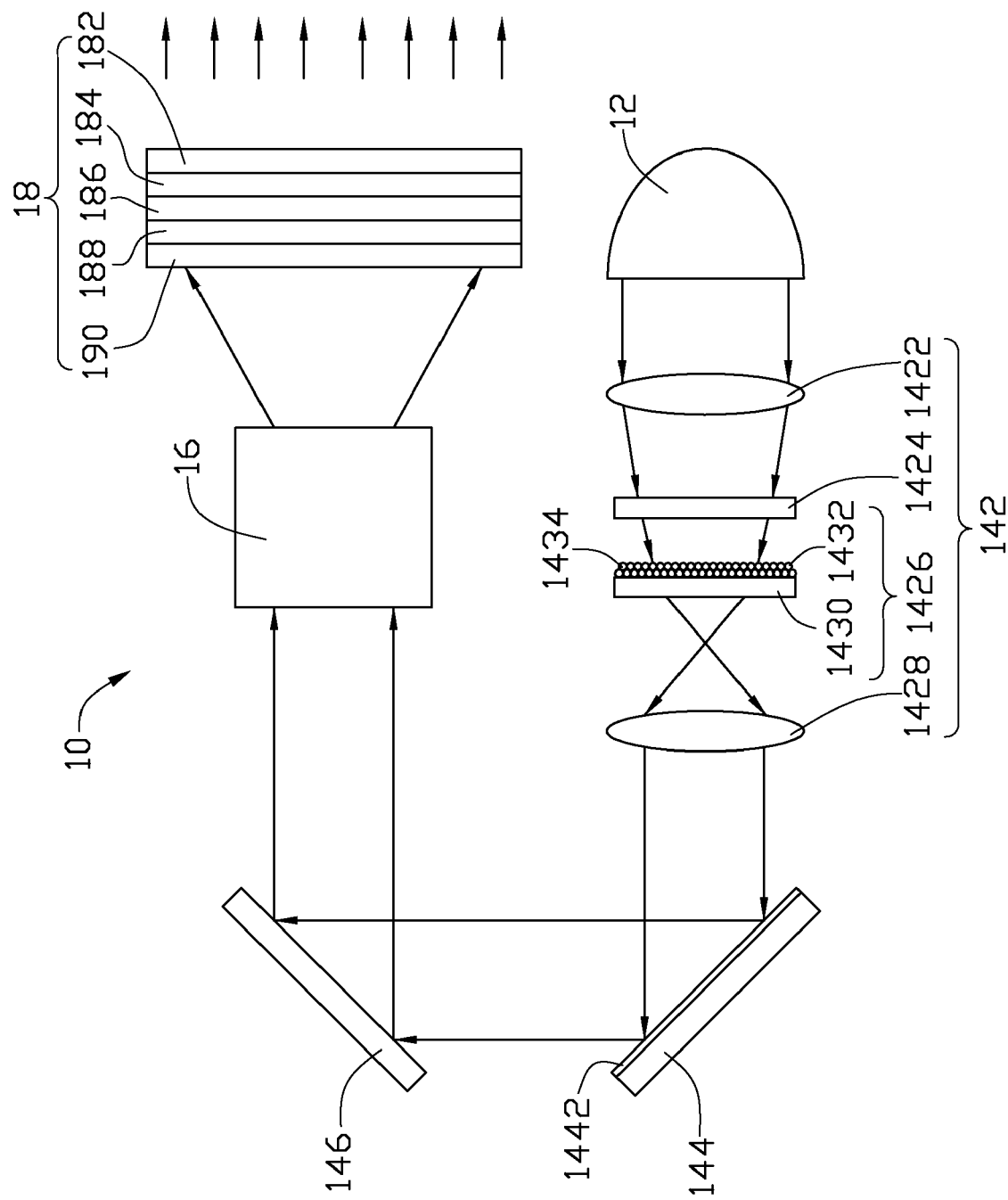

PROJECTING DEVICE

BACKGROUND

1. Technical Field

The disclosure relates to a projecting device.

2. Description of Related Art

Projecting devices have been widely used in presentations or home theater. A typical projecting device includes a light source and a white screen. The light source emits visual lights and display images to the white screen. However, the typical projecting device is affected by surrounding lights. When the surrounding lights are strong, the imaging effect of the typical projecting device is poor.

Therefore, a new projecting device is desired to overcome the above-described shortcoming.

BRIEF DESCRIPTION OF THE DRAWING

Many aspects of the embodiments can be better understood with reference to the following drawing. The components in the drawing are not necessarily drawn to scale, the emphasis instead being placed upon clearly illustrating the principles of the embodiments.

The drawing is a perspective view of one embodiment of a projecting device.

DETAILED DESCRIPTION OF THE EMBODIMENTS

Referring to the drawing, one embodiment of a projecting device 10 includes a light source 12, a filtering component 142, a reflecting mirror 144, a digital micro-mirror device (DMD) 146, a projecting lens 16, and a panel 18. In one embodiment, the light source 12 may be an ultraviolet (UV) light source.

The filtering component 142 includes a condenser 1422, a UV bandpass filter 1424, a polarizer 1426, and a collimating lens 1428. The condenser 1422 converges lights emitting from the light source 12 to the UV bandpass filter 1424. The UV bandpass filter 1424 filters converged lights and allow UV lights to pass through. The polarizer 1426 changes the UV lights passing through the UV bandpass filter 1424 into polarized UV lights. The collimating lens 1428 changes the polarized UV lights into substantially parallel polarized UV lights. In one embodiment, the condenser 1422 and the collimating lens 1428 may be convex lenses.

The polarizer 1426 includes a substrate 1430 and a polarization layer 1432 positioned on the substrate 1430. The substrate 1430 may be made of a glass material or a transparent plastic material. The polarization layer 1432 includes a plurality of substantially parallel nano-members 1434 compactly aligned with each other. In one embodiment, each nano-member 1434 may be a one-piece structure. In another embodiment, each nano-member 1434 may include a plurality of pieces joined end to end. Each nano-member 1434 may be a nanotube, a nanotube bundle, a nanowire, or a nanowire bundle. The nanotube may be a single-walled carbon nanotube, a multi-walled carbon nanotube, a silicon nanotube, a gallium nitride (GaN) nanotube, a zinc oxide (ZnO) nanotube, a iron nanotube, or a copper nanotube. The nanowire may be a silicon nanowire, a GaN nanowire, a ZnO nanowire, an iron nanowire, or a copper nanowire.

The reflecting mirror 144 has a reflecting surface 1442 to reflect the substantially parallel polarized UV lights to the DMD 146. The reflecting surface 1442 is arranged at an angle to the collimating lens 1428. In one embodiment, the angle is about 45 degrees.

The DMD 146 is arranged at an angle to the reflecting surface 1442. In one embodiment, the angle is about 45 degrees. The DMD 146 includes a plurality of microscopic mirrors arranged in a rectangular array corresponding to pixels of an image to be displayed. The microscopic mirrors may be individually rotated by about 10-12 degrees, to an on or off state. At the on state, the substantially parallel polarized UV lights are reflected by the microscopic mirrors to the projecting lens 16, thereby causing the pixels to appear on the panel 18. At the off state, the substantially parallel polarized UV lights are directed elsewhere, thereby making the pixels disappear. The DMD 146 may be connected to an image signal. The microscopic mirrors are adjusted to reflect the substantially parallel polarized UV lights to the projecting lens 16 according to the image signal.

The projecting lens 16 diverges the substantially parallel polarized UV lights reflected by the DMD 146 to the panel 18. In one embodiment, the projecting lens 16 may be a concave lens.

The panel 18 includes a transparent substrate 182, a UV light absorbing layer 184, a first fluorescence material layer 186, a second fluorescence material layer 188, and a third fluorescence material layer 190. In one embodiment, the UV light absorbing layer 184 is positioned on the substrate 182. The first, second and third fluorescence material layers 186, 188, 190 are sequentially positioned on the UV light absorbing layer 184 and adjacent to the projecting lens 16. In another embodiment, the UV light absorbing layer 184 is positioned on one surface of the substrate 182 and apart from the projecting lens 16. The first, second and third fluorescence material layers 186, 188, 190 are positioned on another surface of the substrate 182 and adjacent to the projecting lens 16.

The transparent substrate 182 may be made of a glass material or an acryl material. The first, second, and third fluorescence material layers 186, 188, 190 may be made of transparent fluorescence materials that are excited by UV lights. The UV light absorbing layer 184 may be made of transparent UV light absorbing materials. In use, diverged polarized UV lights pass through the panel 18. The first, second, and third fluorescence material layers 186, 188,190 are excited by the diverged polarized UV lights to emit red, green, and blue lights. The red, green, and blue lights are mixed into vivid lights. The vivid lights pass through the transparent substrate 182. The remainder of the diverged polarized UV lights is absorbed by the UV light absorbing layer 184.

The projecting device 10 applies UV lights to excite the first, second, and third fluorescence material layers 186, 188, 190 to emit lights, which are not as affected by the surrounding lights.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A projecting device, comprising:
   a light source configured to emit lights;
   a filtering component configured to change the lights into substantially parallel polarized ultraviolet lights;
   a reflecting mirror configured to reflect the substantially parallel polarized ultraviolet lights;
   a digital micro-mirror device comprising a plurality of microscopic mirrors arranged in a rectangular array configured to be adjustable to reflect the substantially parallel polarized ultraviolet lights reflected by the reflecting mirror;

a projecting lens configured to diverge the substantially parallel polarized ultraviolet lights; and a panel comprising a transparent substrate, a first fluorescence material layer, a second fluorescence material layer, and a third fluorescence material layer, wherein the first, second, and third fluorescence material layers are positioned on the transparent substrate and configured to be excited by diverged polarized ultraviolet lights and emit red, blue, and green lights.

2. The projecting device of claim 1, wherein the panel further comprises an ultraviolet light absorbing layer positioned between the transparent substrate and the first fluorescence material layer, the ultraviolet light absorbing layer is configured to absorb the diverged polarized ultraviolet lights passing therethrough, and the second and third fluorescence material layers are sequentially positioned on the first fluorescence material layer.

3. The projecting device of claim 1, wherein the panel further comprises an ultraviolet light absorbing layer positioned on one surface of the transparent substrate and apart from the projecting lens, the ultraviolet light absorbing layer is configured to absorb the diverged polarized ultraviolet lights passing therethrough, and the first, second, and third fluorescence material layers are positioned on another surface of the transparent substrate and adjacent to the projecting lens.

4. The projecting device of claim 1, wherein the first, second, and third fluorescence material layers are made of transparent fluorescence materials.

5. The projecting device of claim 1, wherein the filtering component comprises:
   a condenser configured to converge the lights emitted from the light source;
   an ultraviolet bandpass filter configured to filter converged lights and allow ultraviolet lights to pass through;
   a polarizer configured to change the ultraviolet lights into polarized ultraviolet lights; and
   a collimating lens configured to change the polarized ultraviolet lights into the substantially parallel polarized ultraviolet lights.

6. The projecting device of claim 5, wherein the polarizer comprises a substrate and a polarization layer positioned on the substrate; the polarization layer comprises a plurality of substantially parallel nano-members compactly aligned with each other.

7. The projecting device of claim 6, wherein each nano-member is a one-piece structure.

8. The projecting device of claim 6, wherein each nano-member comprises a plurality of pieces joined end to end.

9. The projecting device of claim 6, wherein each nano-member is a nanotube, a nanotube bundle, a nanowire, or a nanowire bundle.

10. The projecting device of claim 5, wherein the reflecting mirror has a reflecting surface arranged at an angle to the collimating lens.

11. The projecting device of claim 10, wherein the digital micro-mirror device is arranged at an angle to the reflecting surface.

12. A panel for a projecting device, comprising:
   a transparent substrate;
   an ultraviolet light absorbing layer positioned on the transparent substrate and configured to absorb ultraviolet light passing therethrough;
   a first fluorescence material layer;
   a second fluorescence material layer; and
   a third fluorescence material layer, wherein the first, second, and third fluorescence material layers are positioned on the ultraviolet light absorbing layer and configured to be excited to emit red, blue, and green lights.

13. The panel of claim 12, wherein the first, second, and third fluorescence material layers are made of transparent fluorescence materials.

14. A panel for a projecting device, comprising:
   a transparent substrate;
   an ultraviolet light absorbing layer positioned on one surface of the transparent substrate and configured to absorb ultraviolet light passing therethrough;
   a first fluorescence material layer;
   a second fluorescence material layer; and
   a third fluorescence material layer, wherein the first, second, and third fluorescence material layers are positioned on another surface of the transparent substrate, and configured to be excited to emit red, blue, and green lights.

15. The panel of claim 14, wherein the first, second, and third fluorescence material layers are made of transparent fluorescence materials.

* * * * *